(No Model.) 2 Sheets—Sheet 2.
A. H. GODFREY.
GATE.
No. 396,558. Patented Jan. 22, 1889.
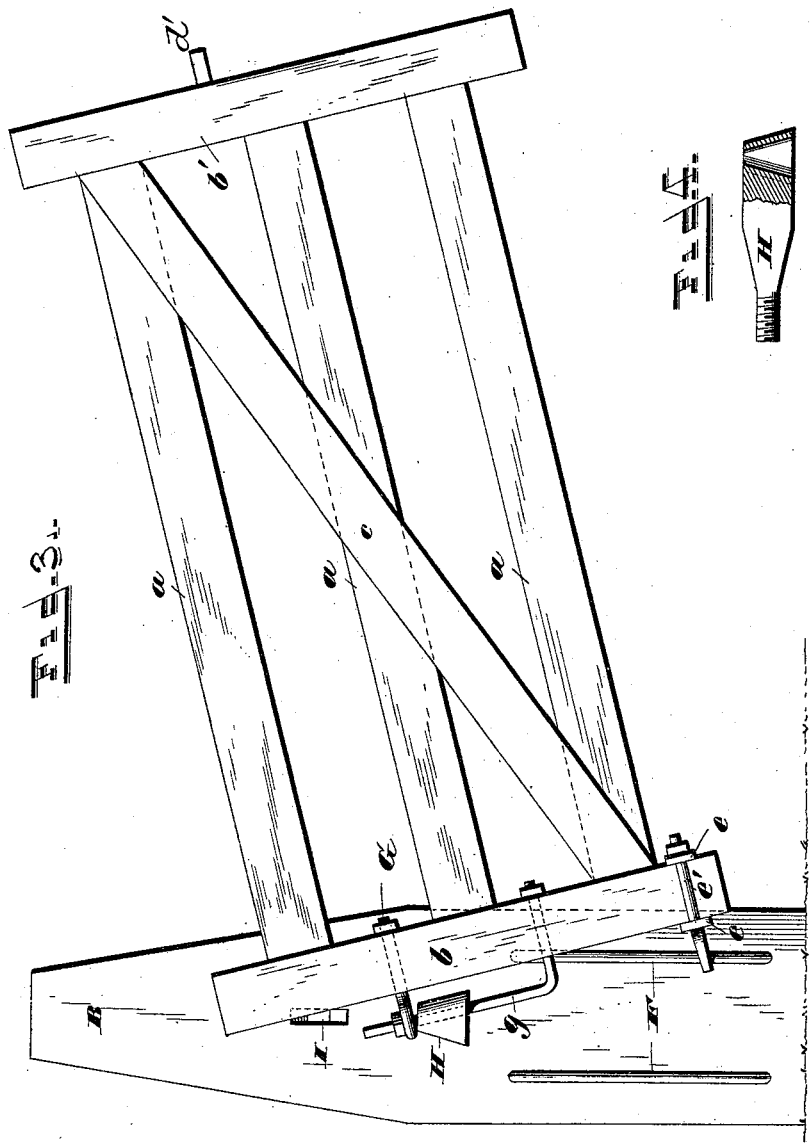
WITNESSES,
Alfred H. Godfrey.
INVENTOR,
by
Attorney.

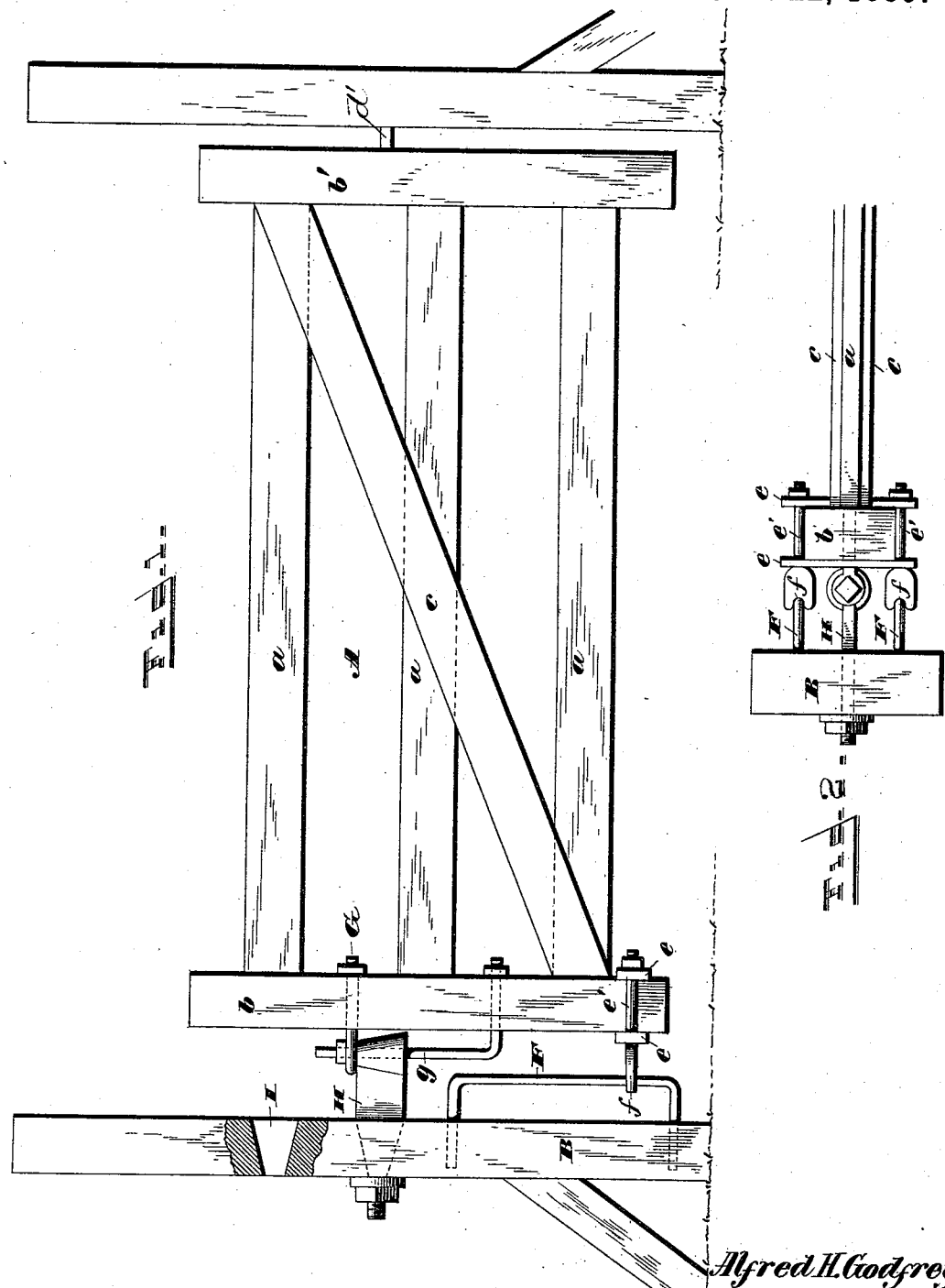

UNITED STATES PATENT OFFICE.

ALFRED H. GODFREY, OF JAMAICA, IOWA.

GATE.

SPECIFICATION forming part of Letters Patent No. 396,558, dated January 22, 1889.

Application filed September 20, 1888. Serial No. 285,870. (No model.)

*To all whom it may concern:*

Be it known that I, ALFRED H. GODFREY, a citizen of the United States of America, residing at Jamaica, in the county of Guthrie and State of Iowa, have invented certain new and useful Improvements in Gates; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in swinging gates; and it consists more especially in the construction and combination of the parts, whereby a gate can be raised so as to be set at different heights, the invention further consisting in the construction and combination of the parts, as will be hereinafter set forth, and specifically pointed out in the claim.

In the accompanying drawings, Figure 1 is a side view of a gate constructed in accordance with my invention, the same being illustrated as closed. Fig. 2 is a plan or top view of a portion of said gate. Fig. 3 is an end view showing the gate open. Fig. 4 is a detail view.

A refers to the gate, which is made up of horizontal battens $a$ $a$ and vertical battens $b$ and $b'$. The gate is provided with the usual diagonal braces, $c$.

The batten $b$ of the gate is provided at its lower end with metal strips $e$ $e$, which are secured in place by bolts $e'$, the ends of which are extended and provided with recesses $f$ $f$, which overlap the irons F, attached parallel with each other to the gate-post B. This gate post B is of more than ordinary width, and the batten $b$ is also wider than those usually employed with gates of this character, thereby giving to the gate a greater swing at its end, which will cause the gate to close automatically when opened.

Near the upper portion of the gate is secured an eyebolt, G, through which eyebolt passes the upper member of the bar $g$, which is bent at right angles and passes through the batten $b$, and is secured thereto by a nut. The upper end of the rod $g$ is screw-threaded for the reception of a nut which lies above the eyebolt G. The rod $g$ passes through an iron, H, which is provided with a conical opening, $h$. This iron H tapers toward its rear end, and is screw-threaded for securing the same in openings I, formed in the gate-post B. The gate-post B is provided with two or more of these openings I, so that the gate can be adjusted to different heights by moving the iron H from one opening to another.

When it is desired that the gate should swing high from the ground, as when snow is upon the ground, the iron H is removed from the lower opening and placed in the upper one by releasing the securing-nut and raising the gate. The vertical sides of this iron H being tapered, it can be jammed securely in the opening in the gate-post. The pin $d'$ is also removed and placed in an opening below the one previously occupied, so that it will engage with the latch.

Having thus described my invention, I claim—

The combination, in a swinging gate, of a post provided with parallel bars F F, having inturned ends, conical or tapered openings I, located above and between the bars F F, an iron, H, adapted to fit within said openings and provided with a screw-threaded portion and nut for wedging the same in position, the end of said iron having a conical opening, the gate-batten $b$, having irons with recesses secured near the lower portion of the batten, an angle-iron, $g$, adapted to pass through the opening in the iron H, and an eyebolt, G, embracing the upper end of said angle-iron, the parts being organized substantially as shown, and for the purpose set forth.

In testimony whereof I affix my signature in presence of two witnesses.

ALFRED H. GODFREY.

Witnesses:
GEORGE WICKHAM,
R. B. MORAIN.